US006526532B1

(12) United States Patent
Cinkler et al.

(10) Patent No.: US 6,526,532 B1
(45) Date of Patent: Feb. 25, 2003

(54) CHANNEL ERROR CORRECTION APPARATUS AND METHOD

(75) Inventors: Kalman Cinkler, Bremen (DE); Karl Dirk Kammeyer, Buchholz (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/434,319

(22) Filed: Nov. 4, 1999

(30) Foreign Application Priority Data

Nov. 6, 1998 (EP) ............................................. 98121220

(51) Int. Cl.[7] ......................... G01R 31/28; G11C 29/00
(52) U.S. Cl. ....................................... 714/712; 714/704
(58) Field of Search ................................ 714/712, 714, 714/704, 708, 715, 779, 746, 43; 382/300, 309, 310, 240; 375/240.27

(56) References Cited

U.S. PATENT DOCUMENTS

| 5,534,925 A | | 7/1996 | Zhong .......................... 348/384 |
| 5,561,668 A | * | 10/1996 | Genter ........................... 370/288 |
| 6,332,043 B1 | * | 12/2001 | Ogata ........................ 375/240.19 |
| 6,362,760 B2 | * | 3/2002 | Kober et al. .................. 341/141 |

FOREIGN PATENT DOCUMENTS

EP       0 718 982 A2    6/1996

OTHER PUBLICATIONS

Strobel, N., et al.: "Model–based Detection and Correction of Corrupted Wavelet Coefficients" *Proceedings of International Conference on Image Processing*; Oct. 26–29, 1997; pp. 925–928.

Cinkler, K.: "Very–Low–Bit–Rate Wavelet Video Coding" *IEEE Journal on Selected Areas in Communications*, vol. 16., No. 1., pp. 4–9, Jan. 1998.

Anderson, J., et al.: "Source and Channel Coding: An Algorithmic Approach" *The Kluwer International Series in Engineering and Computer Science*; 1991; pp. 1–17.

Vetterli, M., et al.: "Signal Compression and Subband Coding" *Wavelets and Subband Coding*; 1995; Chapter 7, pp. 369–430.

* cited by examiner

*Primary Examiner*—Christine T. Tu
(74) *Attorney, Agent, or Firm*—Jenkens & Gilchrist, P.C.

(57) ABSTRACT

To provide an approach to correction of residual errors in subband-based transmission schemes there is provided a channel error correction apparatus with a first synthesis unit for synthesizing a preliminary output signal from subband signals received via a transmission channel. A subband correcting is achieved through a subband reanalysis unit analyzing the preliminary output signal through subband filtering without downsampling, an error estimation unit estimating errors in subband reanalysis output signals using subband specific error patterns, and an error compensation unit correcting the subband signals using error estimation results. A second synthesis unit then synthesizes a final output signal from output signals of the error compensation unit.

23 Claims, 13 Drawing Sheets

FIG.2b  FIG.2c

FIG.3
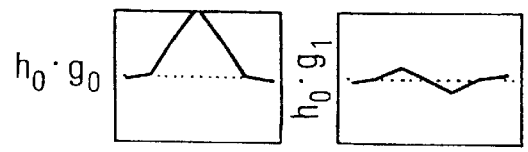
FIG.3b   FIG.3c
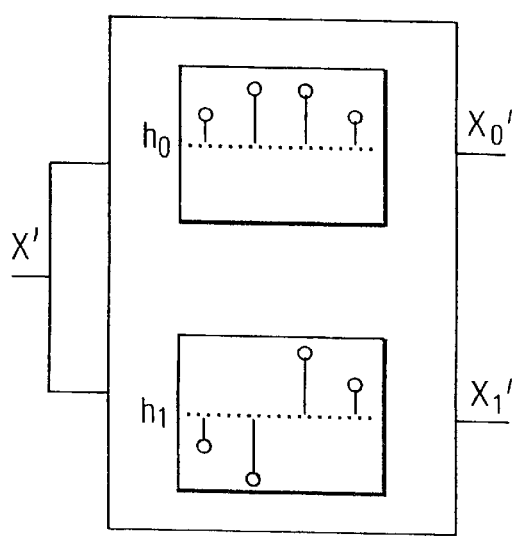
FIG.3a
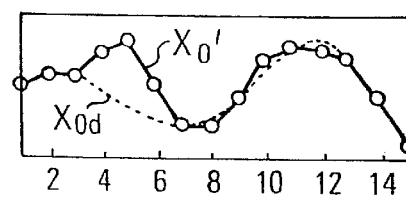
FIG.3d
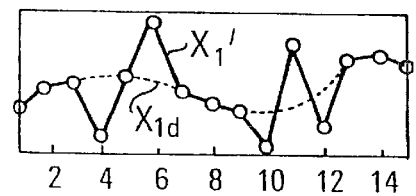
FIG.3e
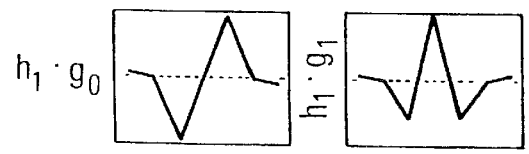
FIG.3f   FIG.3g

CHANNEL ERROR CORRECTION APPARATUS AND METHOD

FIELD OF INVENTION

The present invention relates to a channel error correction apparatus and method. In particular, the present invention relates to an a posteriori channel error correction apparatus using subband synthesis.

TECHNICAL BACKGROUND OF THE INVENTION

FIG. 1 illustrates a usual subband transmission scheme. Here, an input signal X is supplied to an analysis section 100 wherein the input signal X is split into two different subbands, e.g., a low-pass subband and a high-pass subband. This is achieved with a first low-pass filter 102 having an impulse response $h_0$ and a second high-pass filter 104 having an impulse response $h_1$. The outputs $X_{0d}$ and $X_{1d}$ of the different subband filters 102 and 104 are supplied to related downsampling units 106 and 108, respectively, wherein the sampling rate of these signals is lowered. The downsampled signals $X_{0f}$ and $X_{1f}$ are then transmitted via a transmission channel 110.

As also shown in FIG. 1, at the output side of the transmission channel 110 the received signals $X_0$ and $X_1$ are supplied to a synthesis section 116, where they are first upsampled by the respective up-sampling unit 112 and 114, respectively. Furthermore, the synthesis section 116 comprises a synthesis filter (118 and 120) for each subband to which the up-sampled signals are supplied. Finally, the output signals of these synthesis filters 118 and 120 are added in an adding unit 122 in order to derive the final output signal X'. Being an estimate for the original input signal X, the synthesized signal X' is supposed to be as close to X as possible.

The typical application for such a subband-oriented transmission of digital data is the area of image and video coding/decoding wherein most applications are based on a two-band scheme in which the original image signal is split into two subbands. The downsampled subband samples are then quantized, compressed, and transmitted. At the synthesis section 116 they are reconstructed by upsampling, filtering and adding.

FIG. 2 illustrates the result of such a two band subband transmission for an input signal X shown in FIG. 2(a). Just as in FIG. 1 the sender-side down-sampled subband signals are denoted $X_{0f}$ and $X_{1f}$ in FIGS. 2(b) and (c). Also, FIGS. 2(b) and 2(c) show the subband signals $X_0$ and $X_1$ after transmission via the transmission channel. As shown, an error occurs between sample indices 2 and 4, i.e. at sample index 3, in signal $X_0$ and at sample index 6 in signal $X_1$.

FIG. 2(d) shows the output signal achieved through processing these subband signals $X_0$ and $X_1$ in the receiver. Typically, there exist errors in the output signal X' due to transmission errors. For this reason channel or error control coding is used which, however, consumes a certain amount of available channel capacity so that the bandwidth for the actual transmission must be reduced correspondingly. Due to the reduced transmission bandwidth the quantization of the samples must be made coarser to achieve a better compression of the samples of the subband signals $X_{0f}$ and $X_{1f}$. This in turn degrades the quality of the transmitted signals.

SUMMARY OF INVENTION

In view of the above, the object of the invention is to provide an approach to correction of residual errors in subband-based transmission schemes.

According to the present invention, this object is achieved through a channel error correction apparatus comprising a first synthesis means synthesizing a preliminary output signal from subband signals received via a transmission channel through subband synthesis, a subband correcting means with a subband reanalysis means analyzing the preliminary output signal through subband filtering without downsampling, error estimation means estimating errors in subband reanalysis output signals, using subband specific error patterns, and an error compensation means correcting the subband signals using error estimation results, a second synthesis means synthesizing a final output signal from output signals of the error compensation means through subband synthesis.

An important advantage of this channel error correction apparatus is that it allows to minimize channel coding or even to drop it completely and to fully use the available bandwidth of the transmission channel for transmission of more source coded data. The reason for this is the application of an a posteriori channel error correction. In particular, using no downsampled subband signals the error positions and amplitudes in the subband signals may be estimated. This allows for a correction of these signals and a resynthesis of a nearly error-free signal.

Further, the channel error correction apparatus may be extended to multiple dimensions, e.g., to image transmission. The present invention does not require an image restoration or post-processing method and blurring—inherent to most of these methods—is not present.

Since the channel error correction apparatus is used at the receiver side only it relocates the error correction to the receiver solely. This is of particular advantage in applications that have to be enhanced without altering the sender which may already be well defined by, e.g., transmission standards.

According to a preferred embodiment, the subband correcting means may further comprise a subband interpolation means receiving the subband signals and generating related up-sampled subband interpolation signals supplied to the error estimation means. This interpolation enables an improved calculation precision of error amplitudes during error correction.

According to yet another preferred embodiment, the error estimation means comprises at least two error pattern correlation means, at least two error position estimating means and at least two error amplitude estimation means. Here, the error pattern correlation means correlates appropriate combinations of subband reanalysis output signals and upsampled subband interpolation signals with subband specific error patterns for the identification of error positions. In particular, subband specific error patterns are used to identify the error positions.

According to yet another preferred embodiment pairwise convolutions of analysis filter impulse responses and synthesis filter impulse responses are used as such subband specific error patterns during the error estimation. Therefore, according to the present invention particular use is made of the fact that through resynthesizing the received subband signals without downsampling, error indication information is available which is not the case for standard subband transmission schemes. In particular, through carrying out a first synthesis to generate a preliminary signal and then carrying out an additional reanalysis of this preliminary signal the reanalyzed subband signals have patterns comprised therein that allow to identify the error positions.

According to further preferred embodiments of the present invention, in each subband a distinction is made between the inband characteristic error and cross-band characteristic errors. The former kind of error stems from an error occuring during transmission of the related subband while the latter kind stems from errors occuring during the transmission of neighbouring subbands that have an impact on the considered subband due to aliasing or cross redundancy. To identify inband characteristic errors, resynthesized subband signals should be considered. To detect cross-band characteristic errors, differences between resynthesized subband signals and up-sampled interpolated subband signals should be considered. The difference signals allow to achieve a normalization to the resynthesized subband signals and thus facilitate the detection of cross-band characteristic errors having only very small amplitudes.

According to yet another preferred embodiment of the present invention, two subbands are used and the error amplitude estimation means in the error estimation means use different approaches for the estimation of the error amplitude in a low-pass subband and a high-pass subband. The reason for this is that in the low-pass subband due to slow changes of signal amplitude a very good estimate for a corrected sample may be achieved through an interpolation between adjacent samples. This, however, is not the case in the high-pass subband so that here, advantageously, good results are achieved through matching of the error pattern used for identification of the error to the actual subband signal itself at the sample where the error occurs.

The advantages outlined above may also be achieved through application of the channel error correction method according to the present invention. In particular, the channel error correction apparatus and method may be easily applied to the channel error correction during image data transmission.

BRIEF DESCRIPTION OF DRAWINGS

In the following, preferred embodiments of the present invention will be described with respect to the enclosed drawings in which

FIG. 3 shows an outline of a subband transmission scheme using a posteriori channel error correction according to the present invention;

DESCRIPTION OF PREFERRED EMBODIMENTS

In the following, the basic principle underlying the different embodiments of the present invention will be described with respect to FIG. 3.

Figure 1:
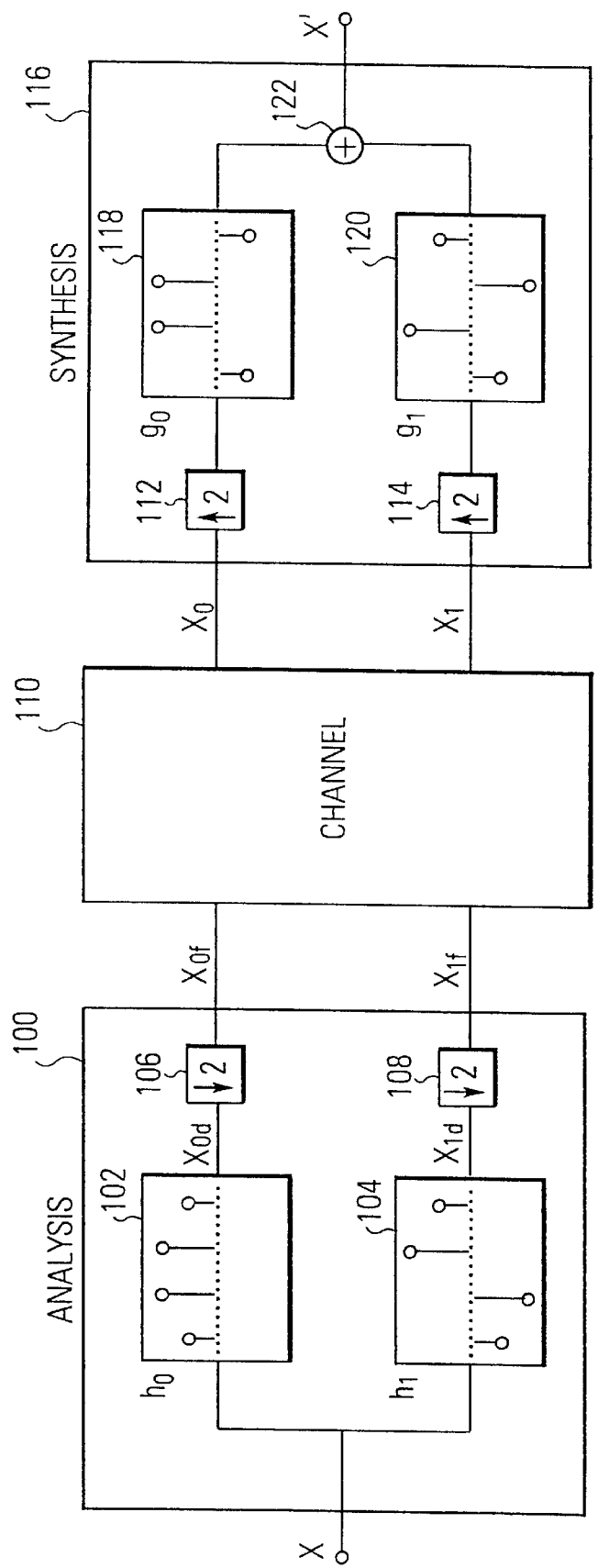
FIG. 1 shows an outline of a two-band subband based transmission scheme according to the technical background of the present invention.

As shown in FIG. 3, according to the present invention received subband signals are synthesized into a preliminary output signal X' as outlined above with respect to FIG. 1. However, the present invention differs over the approach explained with respect to FIG. 1 in that the signal X' is then further processed.

In particular, as shown in FIG. 3, the signal X' is supplied to a subband reanalysis unit wherein it is split into the subband signals $X_0'$ and $X_1'$, respectively.

Further, since no downsampling is carried out during this reanalysis the subband signals $X_0'$ and $X_1'$ are available at the sampling rate of the originally supplied signal X, as shown in FIG. 3(c) and (d). A very important aspect of the invention now is the comparison of these reanalyzed signals $X_0'$ and $X_1'$ with error patterns, such as the pairwise convolutions shown in FIG. 3(a), (b), (e), and (f) of the analysis and synthesis impulse responses according to FIG. 1: $h_0=[1, 3, 3, 1]$, $h_1=[-1, -3, 3, 1]$, $g_0=[-1, 3, 3, -1]$, and $g_1=[-1, 3, -3, 1]$.

Figure 2A:
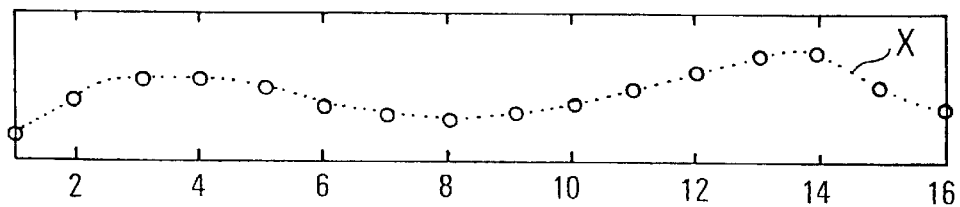
FIG. 2 shows signal forms during the different stages of subband signal transmission according to the scheme shown in FIG. 1.
Figure 2D:
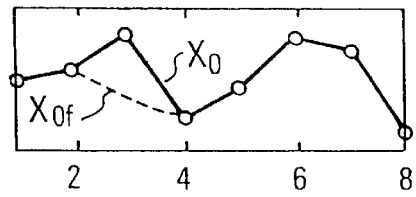
Figure 2D:
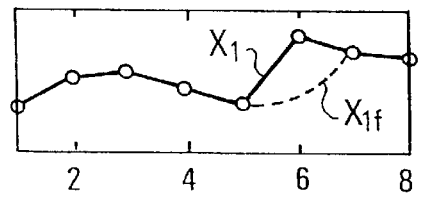
Figure 2D:
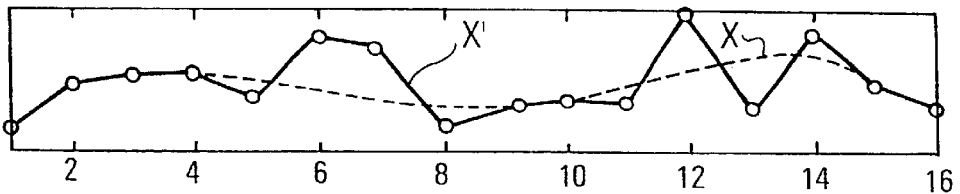

In FIG. 2 it was particularly assumed that during the transmission of subband signals two errors occur, i.e. one in the low-pass band and one in the high-pass band (see FIG. 2(b), (c)). Again for convenience, it is assumed that the errors have positive amplitudes and are not on close positions (time indices) in both subbands.

FIG. 3 now illustrates the impact of these errors on the reanalysis of the signal X' in case no downsampling is carried out. In FIG. 3(c) and (d), both the reanalyzed subband signals ($X_0'$, $X_1'$) and the (error-free) non-downsampled subband signals ($X_{0d}$, $X_{1d}$ in FIG. 1) are shown by the solid and the dotted lines, respectively. Comparing the solid lines with the dotted lines it may be observed that in order to form the reanalyzed subband signal $X_0'$ in FIG. 3(c) the convolution $h_0*g_0$ is superimposed onto the low-pass subband signal $X_{0d}$ in FIG. 3(c) at the left side and that the convolution $h_0*g_1$ is superimposed onto the low-pass subband signal $X_{0d}$ at the right side. In addition, FIG. 3(d) shows that the convolution $h_1*g_0$ is superimposed onto the high-pass subband signal $X_{1d}$ at the left side and that the convolution $h_1*g_1$ is superimposed onto the high-pass subband signal $X_{1d}$ at the right side.

Therefore, using the information in the reanalyzed low-pass and high-pass subband signals $X_0'$ and $X_1'$, and in error patterns like the pairwise convolved analysis and synthesis impulse responses according to the present invention a fairly accurate estimation of error positions and amplitudes can be achieved. It is important to note that error specification information is only available in the reanalyzed subband signals in case no downsampling is carried out because otherwise the downsampled reanalyzed subband signals would exactly match the signals $X_0$ and $X_1$ shown in FIGS. 2(b) and (c), respectively.

Overall, according to the present invention an error estimation is carried out through reanalyzing the signal X' corresponding to the usually generated output signal and then carrying out a correlation analysis between pairwise convolved analysis and synthesis filter impulse responses and the reanalyzed subband signals. A high correlation value indicates the position of an error. The estimation of the error amplitudes will be described in more detail later on.

Also, as shown in FIG. 3, for each subband there may be identified an inband characteristic error pattern according to $h_0*g_0$ and $h_1*g_1$, respectively, being related to a transmission error in the low-pass subband signal $X_0$ and the high-pass subband signal $X_1$, respectively, and further a cross-band characteristic error pattern according to $h_0*g_1$ and $h_1*g_0$ illustrating the impact of a transmission error in the high-pass subband signal $X_1$ onto the reanalyzed low-pass subband signal $X_0'$ and vice versa.

In addition, it should also be noted that the approach outlined with respect to FIG. 3 also applies to a case comprising more than two subbands. In this case, a reanalysis of the signal X' is again carried out to split X' into the different subbands. Then, the pattern recognition approach illustrated with respect to FIG. 3 is carried out such that error patterns are identified in all subbands.

In the following, with respect to FIG. 4, a block diagram of the channel error correction apparatus according to the present invention being based on the principles of the a posteriori channel error correction outlined above will be described in detail for the general case of M subbands.

Figure 4:
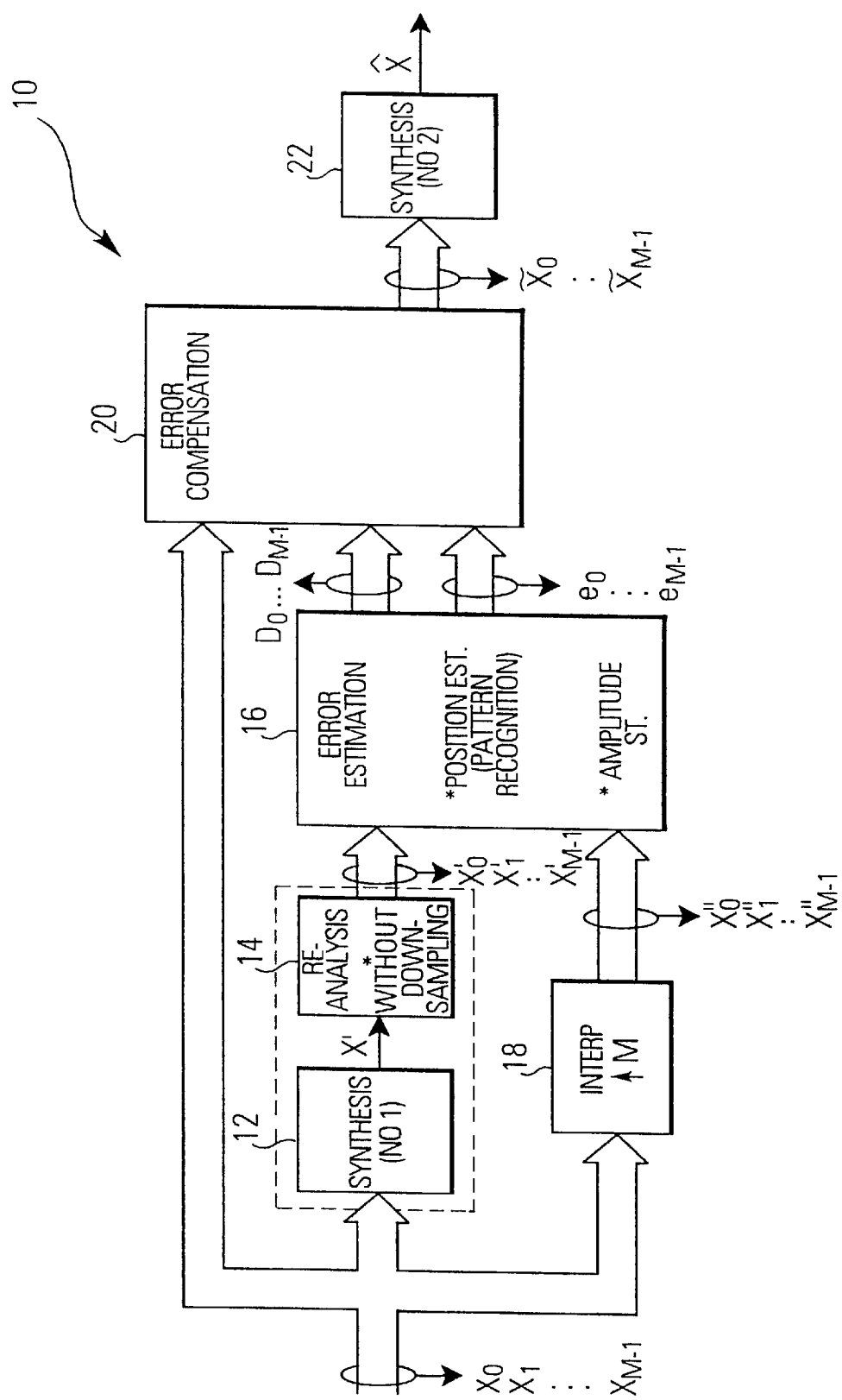
FIG. 4 shows a block diagram for the channel error correction apparatus according to the present invention.

As shown in FIG. 4, the channel error correction apparatus 10 comprises a first synthesis unit 12 that receives subband signals $X_0, \ldots, X_{M-1}$ via a transmission channel and synthesizes the signal X' therefrom. Further, there is provided a reanalysis unit 14 analyzing the signal X' through subband filtering. The reanalysis unit 14 does not carry out any downsampling so that the error patterns in the signals $X_0, \ldots, X_{M-1}$ are still available at the outputs thereof. An error estimation unit 16 receives the reanalyzed subband signals $X'_0, \ldots, X'_{M-1}$ from the reanalysis unit 14. Further, the error estimation unit 16 receives the signals $X''_0, \ldots, X''_{M-1}$ derived through interpolation from the original subband signals $X_0, \ldots, X_{M-1}$ in a subband interpolation unit 18 and estimates the positions as well as the amplitudes of errors in the subband signals $X_0, \ldots, X_{M-1}$. The estimated error positions and amplitudes are indicated by the output signals $D_0, \ldots, D_{M-1}$ and $e_0, \ldots, e_{M-1}$, respectively, of the error estimation unit 16. These signals are then used in an error compensation unit 20 in order to correct errors in the original subband signals $X_0, \ldots, X_{M-1}$. The corrected subband signals $\tilde{X}_0, \ldots, \tilde{X}_{M-1}$ are then supplied to a second synthesis unit 22 where the final output signal $\tilde{X}$ is synthesized.

Operatively, the channel error correction apparatus shown in FIG. 4 implements the different functional steps required to compensate for the effects illustrated above with respect to FIG. 3.

In particular, the error estimation unit 16 implements the matching of error patterns like pairwise convolved impulse responses with combinations of reanalyzed subband signals $X'_0, \ldots, X'_{M-1}$ and upsampled interpolation signals $X''_0, \ldots, X''_{M-1}$ to identify the positions of errors through pattern recognition. In contrast the error amplitudes are solely derived from the reanalyzed subband signals $X'_0, \ldots, X'_{M-1}$.

Here, the interpolation unit 18 is not restricted to a particular type of interpolation. In its simplest implementation, the interpolation unit 18 derives linear mean values between adjacent samples of the subband signals to achieve an up-sampling in correspondence with the number of subbands. Nevertheless, also interpolation approaches of higher order may easily be implemented in the interpolation unit, e.g., spline based approaches.

Further, operatively the first and second synthesis units (12 and 22), implement the synthesis of high rate output signals X' and $\tilde{X}$, respectively, using synthesis sections already explained above with respect to reference numeral 116 shown in FIG. 1.

Thus, for the function of the channel error correction method used in the channel error correction apparatus shown in FIG. 4 the sequence of synthesis, reanalysis, and error estimation allows for the compensation of errors (in the subband signals) introduced during the transmission via the transmission channel.

Figure 7:
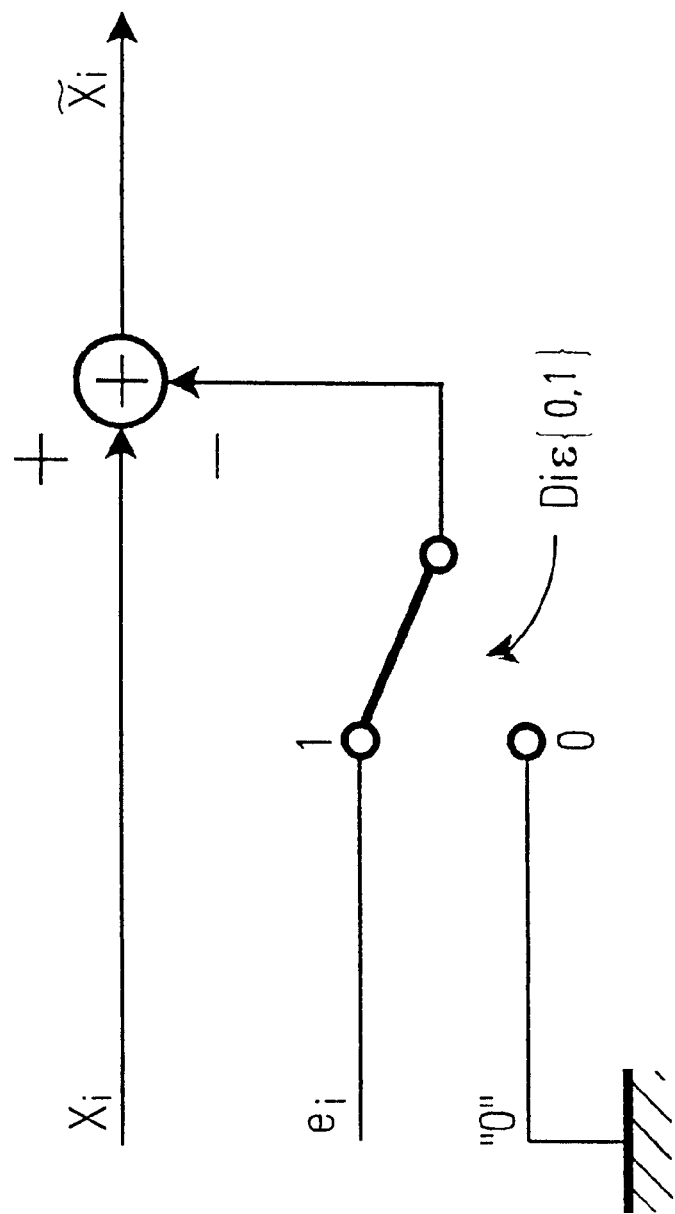
FIG. 7 shows an embodiment of the error compensation unit according to the present invention.
Figure 8:
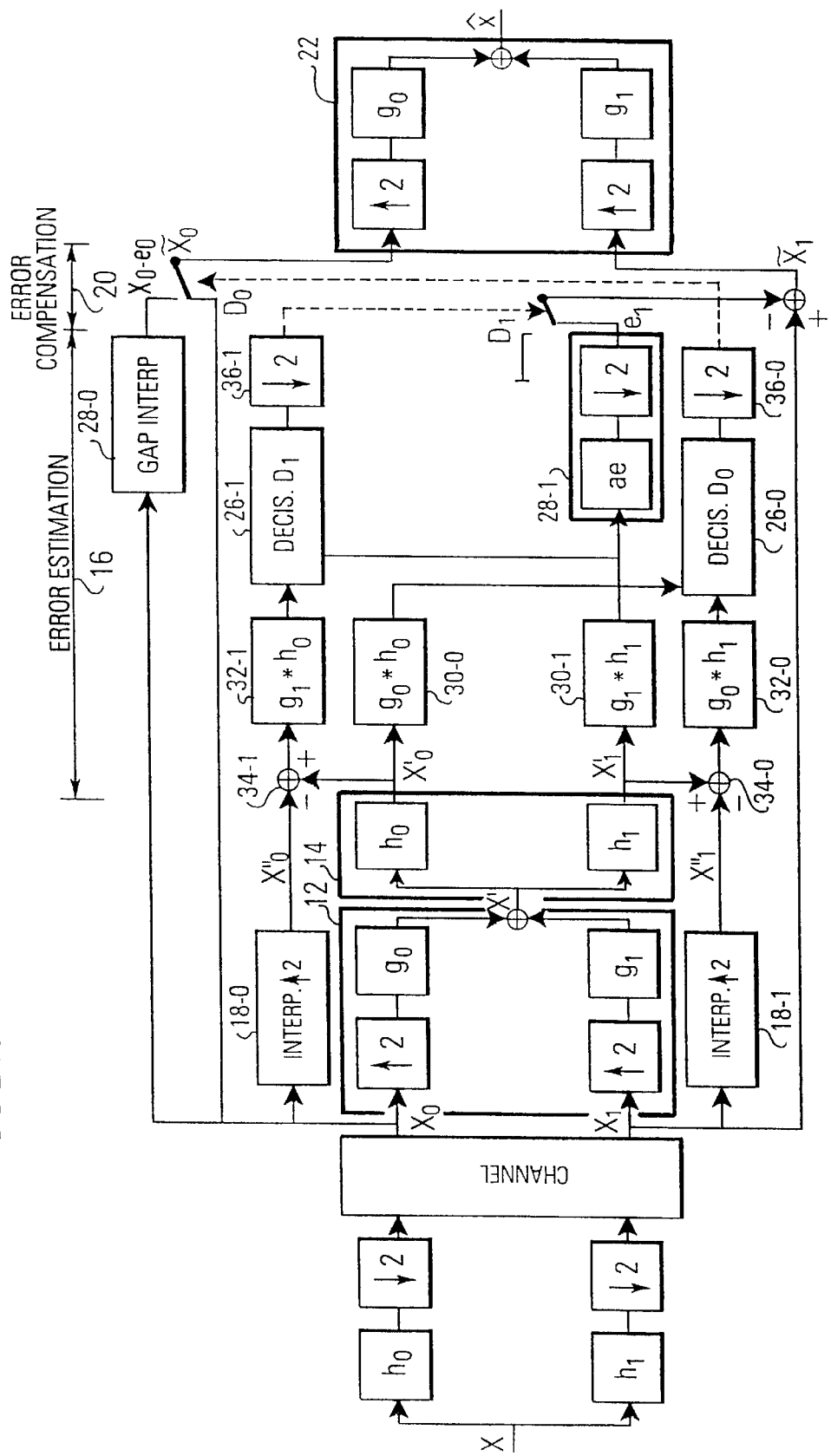
FIG. 8 shows a block diagram for a subband transmission device with a posteriori error correction according to the present invention.

In the following, a specific adaptation of the general inventive concept outlined with respect to FIGS. 3 and 4 will be explained with respect to FIGS. 5 to 8, respectively. While FIG. 5 refers to the general case of M subbands, FIG. 6 to 8 are related to the splitting of signals into two bands (M=2), i.e. a lowpass and a highpass subband.

Since the cross redundancy usually only occurs with respect to adjacent subbands, e.g., even for higher values of M only pairwise convolved impulse response pairs would be considered and not triplets or quadruplets thereof. However, since filter banks splitting a signal into a plurality of subbands usually require FIR filters having a relatively long impulse response, of course, the estimation of error positions and amplitudes is more complex.

Figure 5:
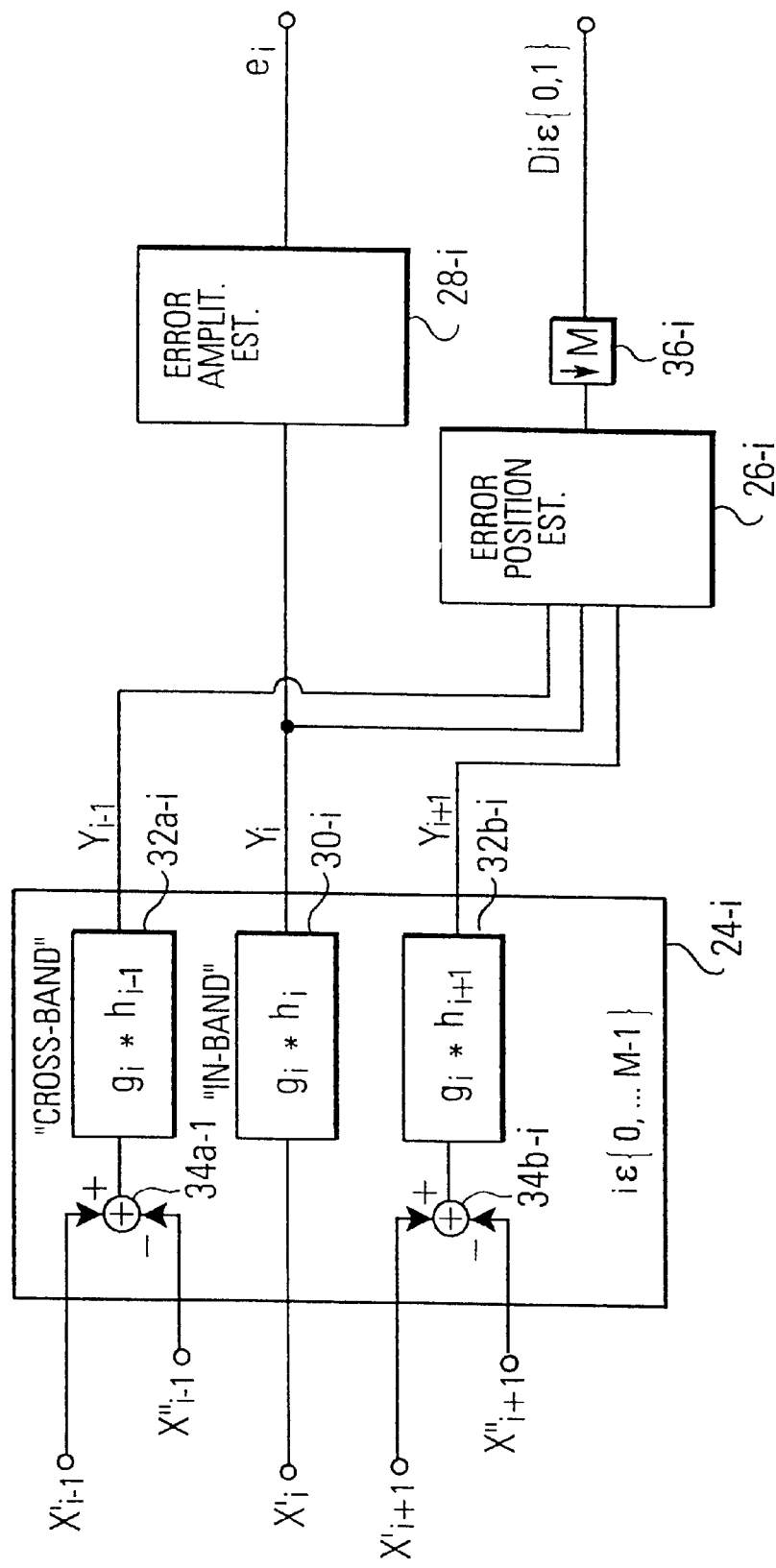
FIG. 5 shows a block diagram for the error estimation (M-band case) in the subband i according to the present invention.
Figure 6:
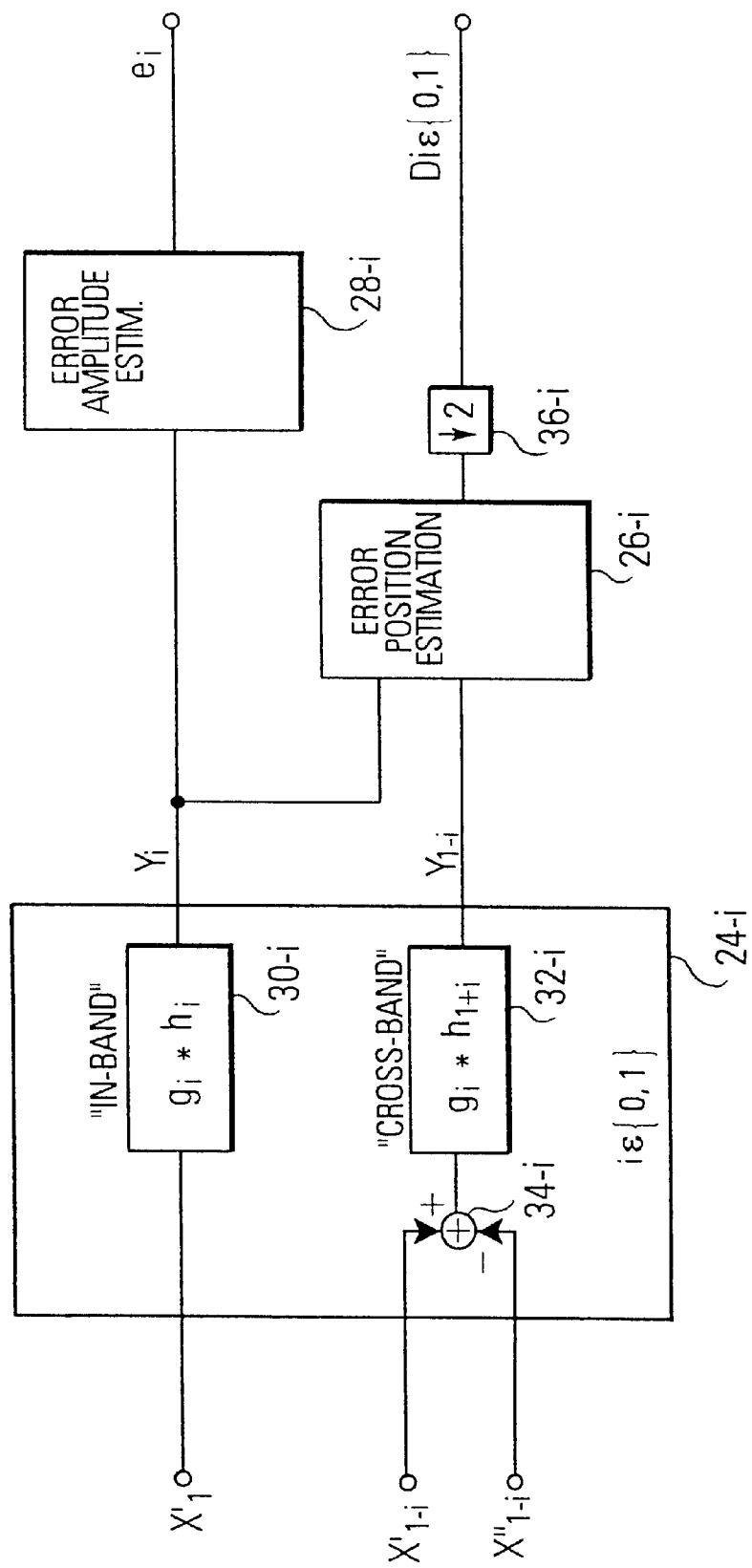
FIG. 6 shows a block diagram for the error estimation (two-band case) in the subband i according to the present invention.

For each subband index i (i=0, ..., M-1), FIG. 5 and FIG. 6 show the provision of signals to the error position and error amplitude estimation units of the error estimation unit 16. As can be seen from FIG. 5 and 6, for each subband index i the error estimation unit 16 comprises an error pattern correlation unit 24-$i$, an error position estimation unit 26-$i$, and an error amplitude estimation unit 28-$i$.

As can be seen from FIG. 5, the error pattern correlation unit 24-$i$ comprises a first correlation unit 30-$i$ to determine an inband characteristic error pattern and a second and third correlation unit 32a-$i$ and 32b-$i$ to determine cross-band characteristic error patterns. To the first correlation unit 30-$i$ there is supplied the reanalyzed subband signal $X'_i$. To the second correlation unit 32a-$i$ there is supplied the difference between the reanalyzed subband signal $X'_{i-1}$ and the interpolated original subband signal $X''_{i-1}$ calculated in a subtraction unit 34a-1. Similarly the difference between the subband signals $X'_{i+1}$ and $X''_{i+1}$ is calculated in a subtraction unit 34b-$i$ and then supplied to the third correlation unit 32b-$i$. Here it should be noted that the subband index i is to be understood in a "modulo M" sense so that i+1 corresponds to zero if i is equal to M-1. Similarly, i-1 corresponds to M-1 if i is equal to zero.

Further, the output signal $Y_i$ of the first correlation unit 30-$i$ and the output signals $Y_{i-1}$ and $Y_{i+1}$ of the second and third correlation unit 32a-$i$ and 32b-$i$ are supplied to the error position estimating unit 26-$i$ for comparison of values derived from the supplied signals with predefined thresholds. The error position estimating unit 26-$i$ outputs a signal indicating whether or not an error position has been identified for a specific sample in the reanalyzed subband signal $X'_i$. Downsampling this signal by a factor of M delivers the binary signal $D_i \in \{0, 1\}$ as an indication of errors in the corresponding subband signal $X_i$. Based on the signal $Y_i$, the error amplitude estimation unit 28-$i$ estimates the amplitudes of the errors and delivers an output signal $e_i$ downsampled accordingly.

Since the error compensation in the error compensation unit 20 is carried out at the rate of the original subband signals $X_0, \ldots, X_{M-1}$ all outputs of the error estimation unit 16 must be provided at this rate. In other words, since the error correction is implemented for the originally supplied signals $X_i$, correction values have to be supplied at the rate of these signals although the error position and amplitude estimations themselves are actually carried out with (up-sampled subband signals $X'_0, \ldots, X'^{M-1}$ and $X''_0, \ldots, X''_{M-1}$ for which a downsampling is not carried out since this would lead to a loss of the error patterns therein. For this reason, a downsampling unit 36-i must be provided at the output of the error position estimation unit 26-i.

For the two-band case (M=2; i=0, 1) the operation of the error estimation unit 16 will be further explained in the following with respect to FIG. 6.

As shown in FIG. 6, the error pattern correlation unit 24-i comprises a first correlation unit 30-i and a second correlation unit 32-i. They implement the correlation process to determine a matching between the pairwise convolved analysis and synthesis impulse responses and combinations of the reanalyzed subband signals $X_0'$, $X_1'$ and the interpolated original subband signals $X_0''$, $X_1''$.

While for the detection of the inband characteristic error pattern the reanalyzed subband signal $X_i'$ is directly supplied to the first correlation unit 30-i, to the contrary, for the estimation of cross-band characteristic error patterns the difference of the reanalyzed subband signal $X_{1-i}'$ and the interpolated original subband signal $X_{1-i}''$ is supplied to the related second correlation unit 32-i. This allows for a normalization of the reanalyzed subband signal to the interpolated subband signal and thus for a facilitated detection of the cross-band characteristic error patterns with normally smaller amplitudes. Overall, this approach reduces the faulty detection of cross-band characteristic error patterns.

In detail, the output of the first correlation unit 30-i for each subband i will be a correlation signal $Y_i$ according to $$Y_i = X_i' * (g_i * h_i).$$

Similarly, the output of the second correlation unit 32-i will be a correlation signal $Y_{1-i}$ according to $$Y_{1-i} = (X_{1-i}' - X_{1-i}'') * (g_i * h_{1-i}).$$

The correlation signals $Y_i$ and $Y_{1-i}$ are then processed in the error position estimation unit 26-i such that an inband characteristic error is identified according to $$d_i(k) = \begin{cases} 1, & Y_i(k) > s_i \\ 0, & \text{otherwise} \end{cases}$$

Here, in the first case a possible inband error is detected at sample index k, in the second case no inband error is detected at sample index k, and $s_i$ denotes an inband threshold value.

Similarly, a cross-band characteristic error is identified in the error position estimation unit 26-i according to $$\tilde{d}_i(k) = \begin{cases} 1, & Y_{1-i}(k) > \tilde{s}_i \\ 0, & \text{otherwise} \end{cases}$$

Here, in the first case a possible cross-band error is detected at sample index k, in the second case no cross-band error is detected at sample index k, and $\tilde{s}_i$ denotes a cross-band threshold value.

It should be noted that this is only an example approach to the estimation of positions of the error patterns in the reanalyzed subband signal $X_i'$ and that any other approach using estimates of the correlation fairly falls within the scope of the present invention.

One such further approach would rely on the determination of a correlation matching value $C_i(k)$ for the inband characteristic error pattern according to $$C_i(k) = \sum_{j=-N}^{N} \left[ \frac{Y_i'(k+j)}{Y_i(k)} - (g_i * h_i)(j) \right]^2$$

and for the cross-band characteristic error pattern according to $$\tilde{C}_i(k) = \sum_{j=-N}^{N} \left[ \frac{Y_i(k+j)}{Y_i(k)} - (g_{i-1} * h_i)(j) \right]^2.$$

Then, these correlation matching values $C_i(k)$ and $\tilde{C}_i(k)$ are further processed in the error position estimation unit 26-i such that an inband characteristic error is identified according to $$d_i(k) = \begin{cases} 1, & C_i(k) \le t_i \\ 0, & \text{otherwise} \end{cases}$$

and a cross-band characteristic error is identified in the error position estimating unit 26-i according to $$\tilde{d}_i(k) = \begin{cases} 1, & \tilde{c}_i(k) \le \tilde{t}_i \\ 0, & \text{otherwise} \end{cases}$$

Irrespective of the specific approach selected for the detection of inband and cross-band specific error pattern the overall identification of error patterns is implemented according to $$D_i(k) = d_i(k) \wedge \tilde{d}_i(k) \in \{0, 1\},$$

i.e., an error position k is only detected if both an inband characteristic error and a cross-band characteristic error are identified through the error position estimating unit 26-i in order to avoid faulty detections of error positions. However, another approach also lying within the scope of the present invention would be to carry out a logical OR-connection between the inband and cross-band characteristic error detection values $d_i(k)$ and $\tilde{d}_i(k)$, respectively.

The operation of the error amplitude estimation unit 28-i in FIG. 6 will now be explained.

The error amplitude estimation unit 28-i uses different approaches in the low-pass subband (i=0) and the high-pass subband (i=1), respectively.

In the low-pass band case it will carry out an error amplitude estimation using, e.g., a linear gap interpolation according to $$e_0(k) = X_0(k) - \frac{[X_0(k-1) + X_0(k+1)]}{2}$$

and then forward this error signal for further processing.

In the highpass band, the determination of the error signal $e_1(k)$ is implemented using a more complex and sophisticated approach. The reason for this is that while the amplitude of the low-pass subband signal changes only rather slowly, to the contrary, the high-pass subband signal has components with higher frequencies so that here the linear interpolation very often would lead to misleading amplitude estimation results.

Therefore, the error amplitude estimation is carried out according to $$E_1(k) = \frac{\sum_{j=-N}^{N} Y_1(j) \cdot (h_1 * g_1)(j)}{\sum_j [(h_1 * g_1)(j)]^2}$$

such that additional adjacent samples are incorporated into the error amplitude estimation process. E.g., five neighbouring samples may be taken into account by setting N=2. The final error signal $e_1$ is obtained by downsampling $E_1(k)$ by a factor of two.

While specific forms of interpolation methods have been described above, e.g., with respect to the low-pass subband signal gap interpolation, of course any other interpolation technique, e.g., spline interpolation of n-th order may be used to derive an appropriate estimate of the error amplitude.

Further, while in the above, examples for the estimation of error positions and amplitudes have been discussed it should be noted that particular methods of determining the positions and amplitudes or errors themselves are not crucial as long as they yield reliable results. Reliability in the sense of the present invention means that no additional faulty errors are detected.

For some awkward signal forms it is almost impossible to tell whether the error candidate is perhaps the reanalyzed subband signal itself or the reanalyzed subband signal with superimposed errors. The decision algorithm implemented in the error position estimation unit 26-$i$ should be rather defensive and in case of doubt leave the error position unmarked.

With reference to FIG. 7, it will now be described how the error compensation is implemented in the error compensation unit 20 for each subband index i.

In case an error has been detected for a given sample of the reanalyzed subband signal $X_i'$, the corresponding sample of $D_i$ is set to unity. Therefore, the switch shown in FIG. 7 is set such that the error signal $e_i$ is selected to be subtracted from the original subband signal $X_i$ in order to produce the output signal $\tilde{X}_i$ of the error compensation unit 20. When, however, no error was detected ($D_i=0$), the subband signal $X_i$ itself will be supplied as output signal $\tilde{X}_i$ for further processing in the second synthesis stage 22.

Thus, while the error estimation is implemented at the higher clock rate without downsampling the actual correction of errors is implemented at the lower clock rate for the original subband signals.

FIG. 8 now shows the application of the complete error correction apparatus and method at a transmission receiver side for a one-dimensional subband transmission with a low-pass and a high-pass subband.

The error correction apparatus and method according to the present invention is only used at the receiver side and therefore does not affect the design of transmitters which usually are well-defined by standards. Alternatively, when the transmitter is not defined by a standard, channel coding can be simplified freeing bandwidth for more source data since according to the present invention possible errors can be corrected at the receiver through a posteriori error correction.

Also, in the low-pass subband either the low-pass subband signal $X_0$ itself or a gap interpolated version thereof is supplied to the subsequent second synthesis unit 22. In other words, in case an error has been identified for a sample of the low-pass subband signal $X_0'$ not the low-pass subband signal sample itself will be forwarded for further processing but a gap interpolated sample $X_0-e_0$. In addition, the error compensated high-pass subband signal $\tilde{X}_i$ is supplied to the second synthesis unit 22, where the final output signal $\hat{X}$ is synthesized.

While in the above different embodiments of the present invention with respect to one-dimensional subband signal transmission have been described with respect to FIGS. 3 to 8, in the following the extension thereof to multiple dimensions, in particular to the transmission of compressed digital image data will be explained with respect to FIGS. 9 to 13.

Figure 9:
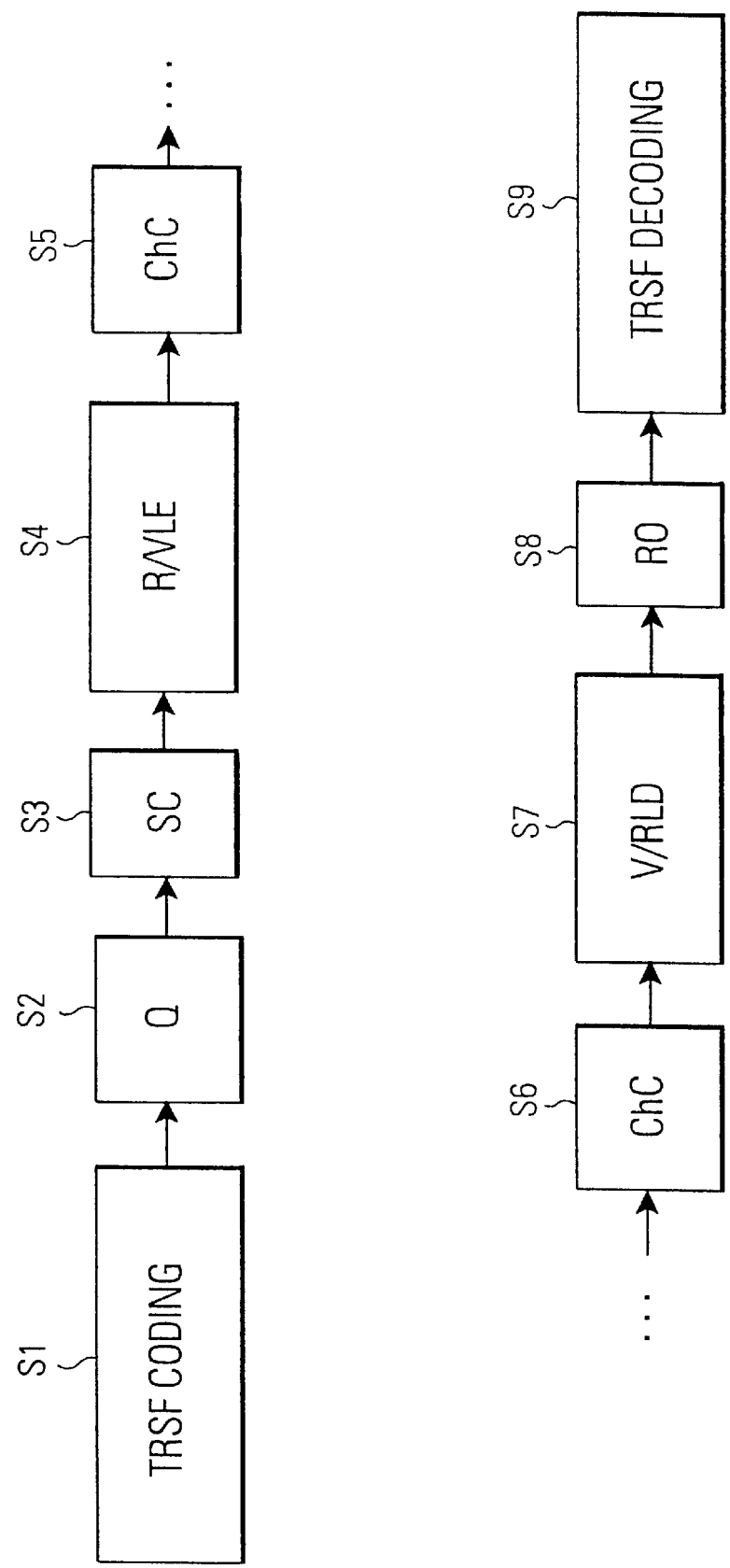
FIG. 9 shows a flow diagram for the transmission of compressed image data as an application example for the present invention.

The steps carried out during the transmission of compressed image data are shown in FIG. 9.

Initially, in step $S_1$ an appropriate transform coding such as subband coding, wavelet coding, etc. is performed. In order to be able to achieve a significant compression ratio quantization follows in step S2. The quantized samples of the transform coding are initially scanned in step S3 which allows an optimal run-length coding and variable length coding in step S4. To mitigate the influence of the transmission channel, channel coding is executed in step S5 and then the signal is transmitted via the channel. Hereafter, channel decoding follows in step S6, followed by run-length and variable length decoding in step S7, reordering of obtained samples into a layout which is needed for transform coding in step S8, and further transform coding itself in step S9.

Figure 10:
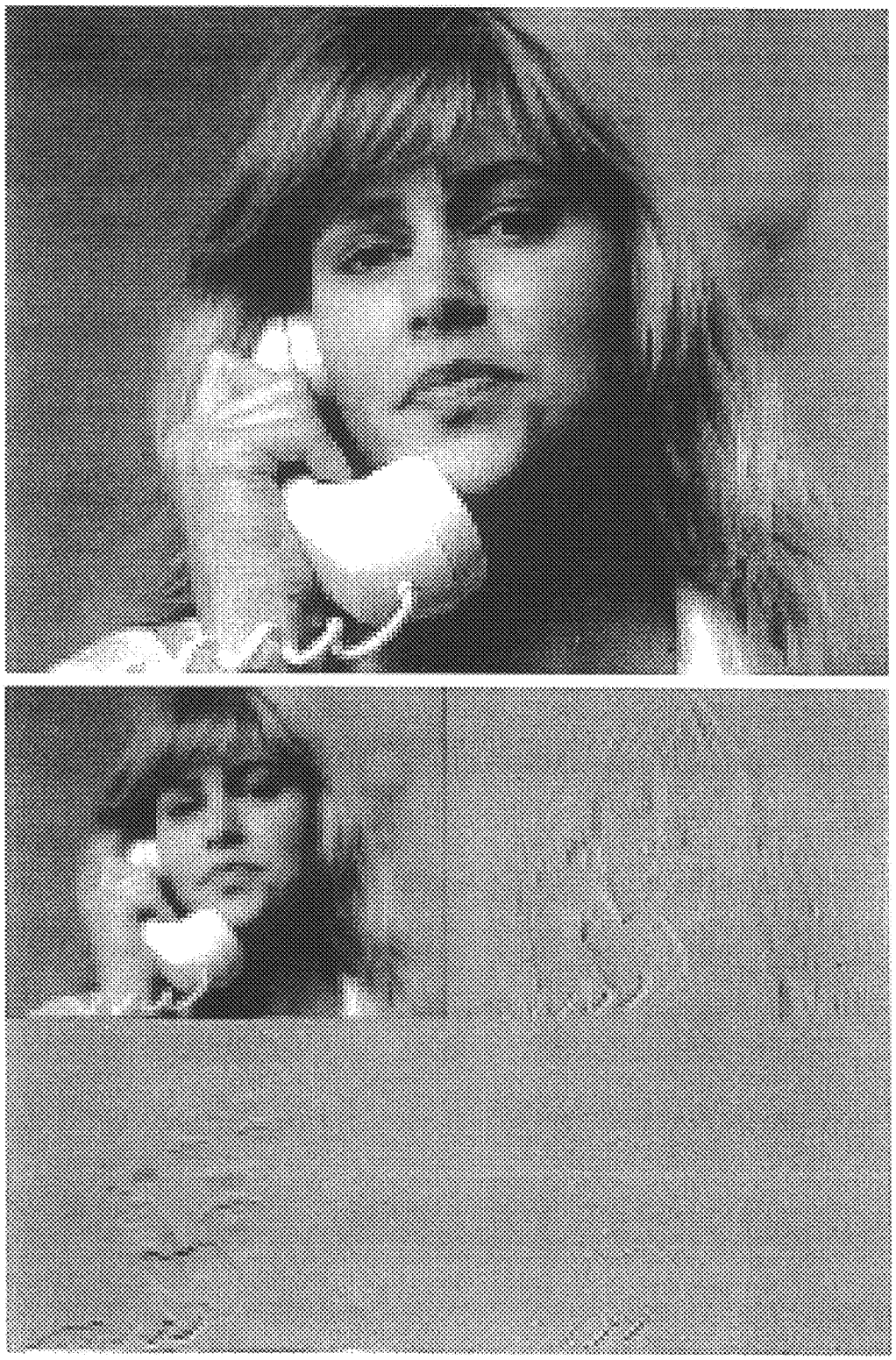
FIG. 10 shows an original image and its subband decomposition before transmission.

In this approach, an image is to be considered as a two-dimensional matrix wherein the rows of the matrix form one-dimensional signals as well as columns thereof. As shown in FIG. 10, in order to apply the one-dimensional approach outlined above to the transmission of compressed image data the division into subbands is applied to the matrix row by row such that each row is divided into two shorter rows which together have the length of the original rows while maintaining the arrangement of the original image data. This leads to two images with reduced width, one having samples of the low-pass band type and the other having samples of the high pass band type.

Further, the different images with reduced width are split through applying the same approach to related columns thereof so that a total of four subband images is obtained after subband decomposition of the original image data as shown in the bottom part of FIG. 10.

One particular form of such a decomposition is the so-called wavelet decomposition for which just as in subband coding, signals are decomposed in overlapping subbands. However, wavelet decomposition allows for a variable time/frequency resolution and therefore may be better adapted to the prevailing input image data signal.

With respect to decomposition and analysis during wavelet coding there is also provided a related reconstruction and synthesis of subbands during wavelet decoding. Since this specific form of decomposition is only related to the provision of image data before the transmission via the transmission channel no further explanation thereof will be given and reference is made to M. Vetterli and J. Kovacevic, *Wavelets and Subband Coding*, Prentice Hall PTR, 1995, and K. Cinkler, *Very Low Bit-Rate Wavelet Video Coding*, Journal on Selected Areas in Communications, Special Issue on Very Low Bit-Rate Video Coding, Vol. 16, No. 1, pp. 4, January 1998, respectively.

When applying the wavelet decomposition, scanning of samples is done subbandwise. Despite the special orientation property of the wavelet decomposition the samples are scanned in horizontal direction, i.e. rowwise in all subbands.

Further, typically high-pass subbands contain a lot of samples whose values are below the quantization level. Therefore, the use of runlength coding as described in, e.g., J. B. Anderson and S. Mohan, Source and Channel Coding, Kluwer Academic Publishers, 1991, is justified for pre-compression of these subband regions in step S4. This runlength coding maps byte-sequences of various lenghts onto byte-blocks of fixed length. To achieve further compression, variable length coding techniques like arithmetic coding of Huffman coding may be used. Huffman coding maps a byte onto a short bit stream of variable length. It is self-evident that such a compressed bit stream is very vulnerable against channel noise. Every bit error desynchronizes the Huffman decoder so that a self-synchronizing decoder must be used in step S7 shown in FIG. 9.

Further, such a Huffman decoder would deliver byte streams that sporadically contain those erroneous bytes while the run-length decoder should be robust against error bursts and be able to deliver a byte stream of the same length as at the input of the run-length coder. Here, the easiest way to implement such run-length and Huffman coder/decoder path is to insert resynchronization and position marks in the byte and bit streams.

Figure 11:
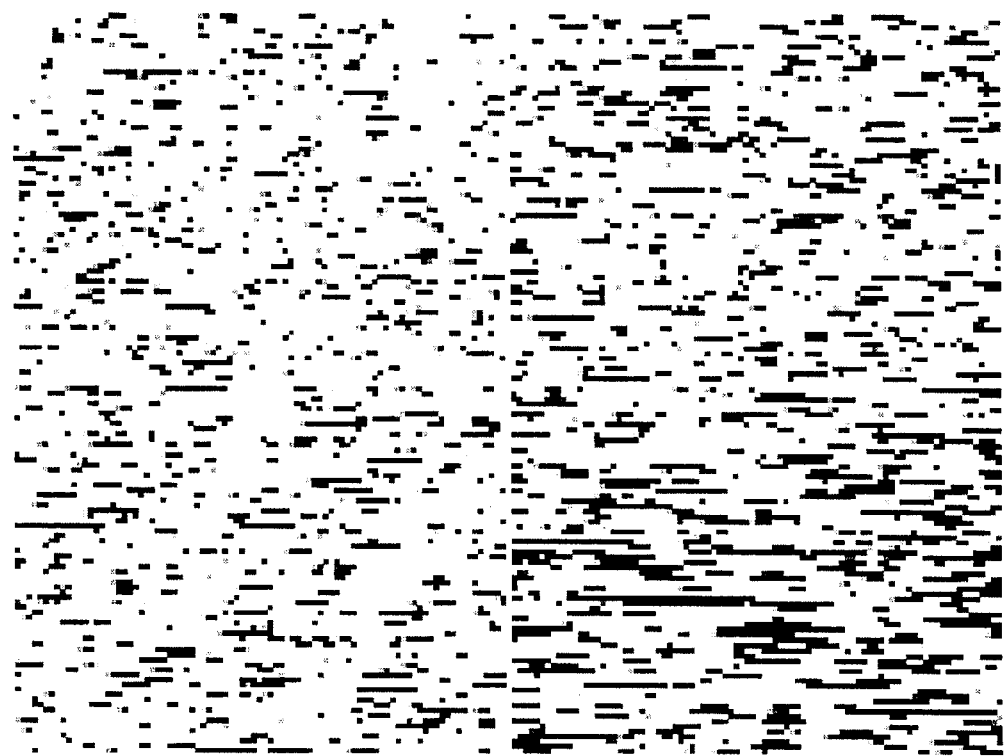
FIG. 11 shows an example for an error distribution and related patterns in a re-ordered subband byte plane.

FIG. 11 shows an example of the distribution and patterns of such an error propagation in the row by row reordered subbandwise byte plan expressed via the shade of gray.

As can be seen in FIG. 11, this error distribution is highly signal-dependent. Further, the four subbands depicted in the lower part of FIG. 10 bitwise XOR-ed with the corresponding error values shown in FIG. 11 constitute the input data for the transform decoding in step S9. During this decoding the application of the error correction apparatus and related method described with respect to FIGS. 3 to 8 is particularly advantageous since errors that have been left undetected or uncorrected in one direction can then be handled successfully during decoding of the next direction. Therefore, subband wavelet image coding with separable filters is the ideal application in this sense.

At the receiver side, during synthesis, transform decoding starts with columns of subbands lying upon each other. Horizontal error bursts represent single errors for vertical processing so that the error correction approach according to this invention can effectively correct them. This interleaving effect is the reason why all these subbands are scanned solely horizontally. Further, the reason for using a defensive error searching strategy according to the present invention is that errors not being marked in this vertical synthesis can still be detected and corrected during subsequent horizontal processing.

Figure 12:
FIG. 12 shows an image transmission example for a binary symmetric transmission channel with a mean bit error probability of 0.001.
Figure 13:
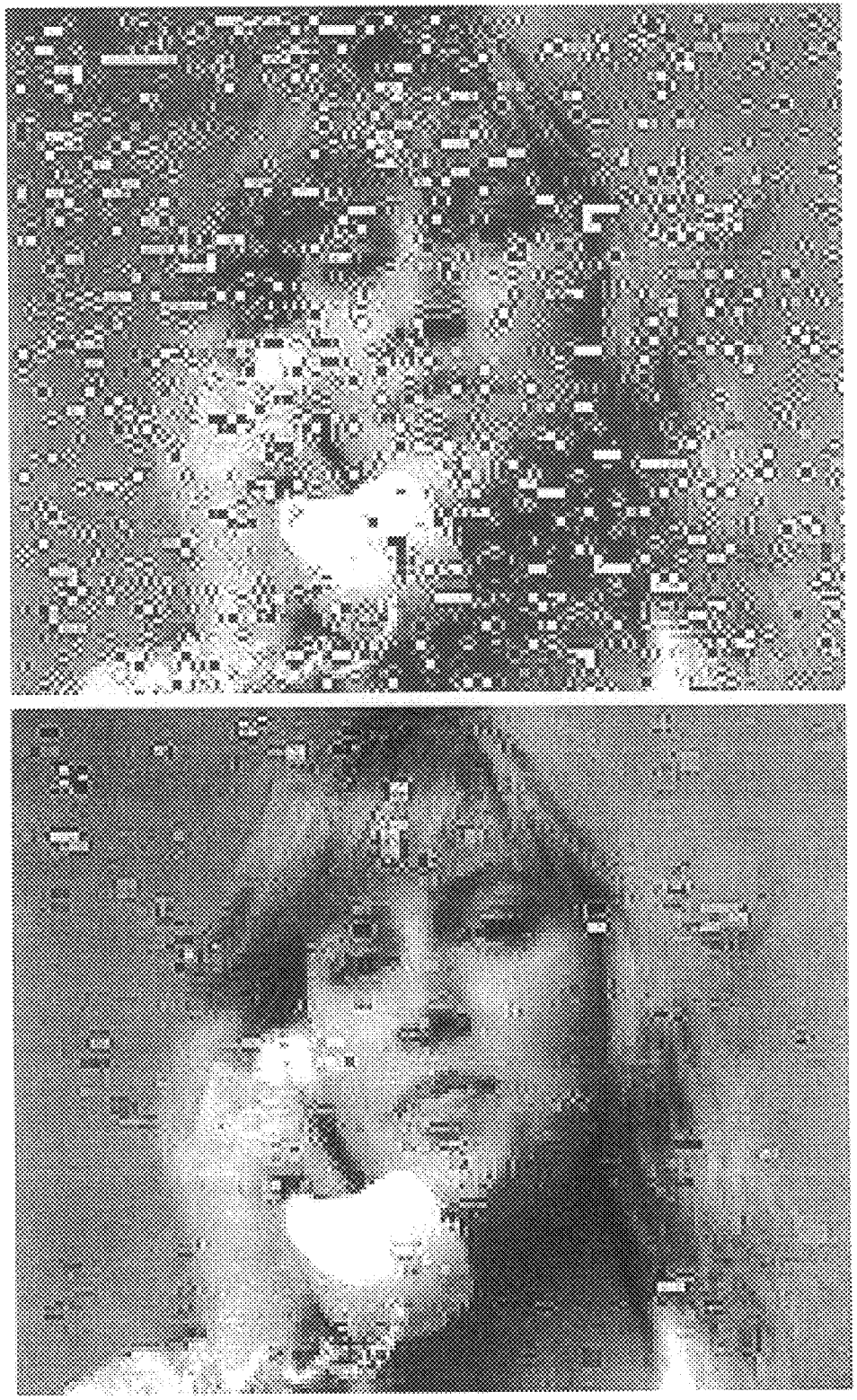
FIG. 13 shows an image transmission example for a binary symmetric transmission channel with a mean bit error probability of 0.01.

In FIG. 12 and 13, respectively, simulation results for the two channel bit error probabilities $P_e=0.001$ and $P_e=0.01$ are given.

According to FIG. 12 and 13, the bit error probabilities represent mean bit error probabilities for a binary symmetric transmission channel. Due to run-length and Huffman decoding, the number of errors immediately before synthesis is much higher than right after the channel and depends on the signal.

In FIG. 12 and 13 the upper image represents the finally generated image without the error correction method according to the present invention and the lower image illustrates the result after application of the channel error correction apparatus according to the present invention. From the comparison it is obvious that the invention yields highly effective results in terms of suppressing burst errors resulting from run-length and Huffman decoding of erroneous bit streams. In particular, FIG. 13 demonstrates the potential that is achievable within the framework of the present invention. Nevertheless, in situations where error bursts occur in adjacent rows and above one another some errors remain according to the artefacts shown in the lower images in FIG. 12 and 13.

Further, when being applied to compressed image data transmission the channel error correction apparatus and method according to the present invention does not depend on the image scene since it is not model based. This facilitates the application of the present invention. It also allows usage of channel codes of higher code rates, i.e. "weaker codes", and therefore a transmission of more image data in the same bandwidth.

Although preferred embodiment(s) of the method and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A channel error correction apparatus, comprising:
   first synthesis means synthesizing a preliminary output signal from subband signals received via a transmission channel through subband synthesis;
   a subband correcting means including:
      a subband reanalysis means analyzing the preliminary output signal through subband filtering without downsampling;
      an error estimation means estimating errors in subband reanalysis output signals using subband specific error patterns; and
      an error compensation means correcting the subband signals using error estimation results; and
   a second synthesis means synthesizing a final output signal from output signals of the error compensation means through subband synthesis.

2. The channel error correction apparatus according to claim 1, wherein the subband correcting means further comprises a subband interpolation means receiving the subband signals and generating related up-sampled subband interpolation signals supplied to the error estimation means.

3. The channel error correction apparatus according to claim 2, wherein the error estimation means of the subband correcting means comprises:
   at least two error pattern correlation means correlating appropriate combinations of subband reanalysis output signals and upsampled subband interpolation signals with subband specific error patterns;
   at least two error position estimating means identifying error positions in the subband reanalysis output signals through comparison of values calculated from the output signals of the error pattern correlation means with predefined threshold values; and
   at least two error amplitude estimation means estimating error amplitudes using an output signal of the error pattern correlation means or the original subband signal.

4. A channel error correction apparatus, comprising:
   first synthesis means synthesizing a preliminary output signal from subband signals received via a transmission channel through subband synthesis;

a subband correcting means including:
  a subband reanalysis means analyzing the preliminary output signal through subband filtering without downsampling;
  an error estimation means estimating errors in subband reanalysis output signals using subband specific error patterns; and
  an error compensation means correcting the subband signals using error estimation results;
a second synthesis means synthesizing a final output signal from output signals of the error compensation means through subband synthesis; and
wherein the error estimation means uses pairwise convolutions of analysis filter impulse responses and synthesis filter impulse responses as subband specific error patterns.

5. The channel error correction apparatus according to claim 4, which comprises a two band subband correcting means handling a low pass subband and a high pass subband, respectively, and that a dedicated analysis impulse response and synthesis impulse response is used for each subband.

6. A channel error correction apparatus, comprising:
first synthesis means synthesizing a preliminary output signal from subband signals received via a transmission channel through subband synthesis;
a subband correcting means including:
  a subband reanalysis means analyzing the preliminary output signal through subband filtering without downsampling;
  error estimation means estimating errors in subband reanalysis output signals using subband specific error patterns; and
  error compensation means correcting the subband signals using error estimation results;
a second synthesis means synthesizing a final output signal from output signals of the error compensation means through subband synthesis, wherein the error estimation means of the subband correcting means comprises:
  at least two error pattern correlation means correlating appropriate combinations of subband reanalysis output signals and upsampled subband interpolation signals with subband specific error patterns;
  at least two error position estimating means identifying error positions in the subband reanalysis output signals through comparison of values calculated from the output signals of the error pattern correlation means with predefined threshold values; and
  at least two error amplitude estimation means estimating error amplitudes using an output signal of the error pattern correlation means or the original subband signal; and
each error pattern correlation means correlates the subband reanalysis output signal with a related inband characteristic error pattern to derive an inband characteristic correlation output signal ($Y_i$) according to $$Y_i = X_i'*(g_i*h_i)$$

and the error pattern correlation means further correlates the difference between the subband reanalysis output signal and the up-sampled subband interpolation signal with a cross-band characteristic error pattern to derive a cross-band characteristic correlation output signal according to $$Y_{1-i} = (X_{1-i}' - X_{1-i}'')*(g_i*h_{1-i})$$

7. The channel error correction apparatus according to claim 6, which comprises a two band subband (dual subband) correcting means handling a low pass subband and a high pass subband, respectively, and wherein a dedicated analysis impulse response and synthesis impulse response is used for each subband.

8. The channel error correction apparatus according to claim 7, wherein each error position estimating means identifies an inband characteristic error according to $$d_i(k) = \begin{cases} 1, & Y_i(k) > s_i \\ 0, & \text{otherwise} \end{cases}$$

and a cross-band characteristic error according to $$\tilde{d}_i(k) = \begin{cases} 1, & Y_{1-i}(k) \leq \bar{s}_i \\ 0, & \text{otherwise} \end{cases}$$

where $s_i$ and $\bar{s}_i$ are predefined threshold values and that the output of the error position estimating means for each sample of the subband reanalysis output signal is $$D(k) = d_i(k) \wedge \tilde{d}_i(k) \in \{0, 1\}$$

9. The channel error correction apparatus according to claim 7, wherein each error position estimating means—identifies an error correlation matching value according to $$C_i(k) = \sum_{j=-N}^{N}\left[\frac{Y_i(k+j)}{Y_i(k)} - (g_i*h_i)(j)\right]^2$$

and further a cross-band characteristic error correlation matching value ($\tilde{C}_i(k)$) according to $$\tilde{C}_i(k) = \sum_{j=-N}^{N}\left[\frac{Y_{1-i}(k+j)}{Y_{1-i}(k)} - (g_i*h_{1-i})(j)\right]^2$$

10. The channel error correction apparatus according to claim 9, wherein each error position estimating means—identifies an inband characteristic error according to $$d_i(k) = \begin{cases} 1, & C_i(k) \leq t_i \\ 0, & \text{otherwise} \end{cases}$$

and a cross-band characteristic error according to $$\tilde{d}_i(k) = \begin{cases} 1, & \tilde{C}_i(k) \leq \tilde{t}_i \\ 0, & \text{otherwise} \end{cases}$$

where $t_i$ and $\tilde{t}_i$ are predefined threshold values and that the output of the error position recognizing means for each sample of the subband reanalysis output signal is $$D(k) = d_i(k) \wedge \tilde{d}_i(k) \in \{0, 1\}$$

11. The channel error correction apparatus according to claim 7, wherein the error amplitude estimation means—estimates the amplitude of an error in the sample of a high pass subband reanalysis output signal through evaluation of adjacent samples according to $$E_1(k) = \frac{\sum_{j=-N}^{N} Y_1'(j) \cdot (h_1 * g_1)(j)}{\sum [(h_1 * g_1)(j)]^2}$$

12. The channel error correction apparatus according to claim 11, wherein the error compensation means subtracts the estimated error amplitude in case the error position recognizing means identifies an error.

13. The channel error correction apparatus according to claim 6, wherein each error amplitude estimation means—estimates the amplitude of an error in the sample of a low pass subband reanalysis output signal through gap interpolation with adjacent samples according to $$e_o(k) = X_o(k) - \frac{[X_o(k-1) + X_o(k+1)]}{2}.$$

14. The channel error correction apparatus according to claim 13, wherein the error compensation means subtracts the estimated error amplitude in case the error position recognizing means identifies an error.

15. A channel error correction method, comprising the steps:
   carrying out a first synthesis to generate a preliminary output signal from subband signals received via a transmission channel through subband synthesis;
   analyzing the preliminary output signal through subband filtering without downsampling to generate reanalyzed subband signals for identification of subbarid specific error patterns therein;
   compensating errors in the originally received 30 subband signals using error compensation information derived from the reanalyzed subband signals; and
   using the error compensated subband signals for the synthesis of a final output signal.

16. The channel error correction method according to claim 15, wherein for the estimation of error amplitudes a subband interpolation is carried out with respect to each received subband signal to generate up-sampled subband interpolation signals to be compared with the re-analyzed subband signals, respectively.

17. A channel error correction method, comprising the steps:
   carrying out a first synthesis to generate a preliminary output signal from subband signals received via a transmission channel through subband synthesis;
   analyzing the preliminary output signal through subband filtering without downsampling to generate reanalyzed subband signals for identification of subband specific error patterns therein;
   compensating errors in the originally received subband signals using error compensation information derived from the reanalyzed subband signals; and
   using the error compensated subband signals for the synthesis of a final-output signal, wherein the error estimation step subdivides into the steps:
      correlating apppropriate combinations of reanalyzed subband signals and up-sampled subband interpolation signal with subband specific error patterns;
      identifying error positions in the reanalyzed subband signals through comparison of the correlation results with predefined threshold values; and
      estimating error amplitudes for each identifying reanalyzed subband signal and related up-sampled subband interpolation signals.

18. A channel error correction method, comprising the steps:
   carrying out a first synthesis to generate a preliminary output signal from subband signals received via a transmission channel through subband synthesis;
   analyzing the preliminary output signal through subband filtering without downsampling to generate reanalyzed subband signals for identification of subband specific error patterns therein;
   compensating errors in the originally received subband signals using error compensation information derived from the reanalyzed subband signals;
   using the error compensated subband signals for the synthesis of a final output signal; and
   wherein the error estimation is carried out using pairwise convolutions of subband analysis impulse responses and subband synthesis impulse responses as subband specific error patterns.

19. The channel error correction method according to claim 18, wherein each subband reanalysis output signal is correlated with a related inband characteristic error pattern to derive an inband characteristic correlation output signal according to $$Y_i = X_i^{1*}(g_i * h_i)$$

and that further the difference between the subband reanalysis output signal and the up-sampled subband interpolation signal is correlated with a cross-band characteristic error pattern to derive a cross-band characteristic correlation output signal according to $$Y_{1-i} = (X_{1-i}^1 - X_{1-i}^{11})^* (g_i * h_{1-i})$$

20. The channel error correction method according to claim 19, wherein the identification of an error position is carried out with respect to an inband characteristic error according to $$\tilde{d}_i(k) = \begin{cases} 1, & Y_i(k) > s_i \\ 0, & \text{otherwise} \end{cases}$$

and with respect to a cross subband characteristic error according to $$d_i(k) = \begin{cases} 1, & Y_{1-i}(k) > \bar{s}_i \\ 0, & \text{otherwise} \end{cases}$$

where $s_i$ and $\bar{s}_i$ are predefined threshold values and then the determination whether an error prevails for a specific sample is determined according to $$D(k) = d_i(k) \wedge \tilde{d}_i(k) \in \{0, 1\}$$

21. The channel correction method according to claim 18, wherein in a low-pass subband the error amplitude is used through linear gap interpolation.

22. The channel error method correction according to claim 18, wherein the error amplitude in a high-pass subband is implemented through evaluation of adjacent samples of the reanalyzed high-pass subband signal according to $$E_1(k) = \frac{\sum_{j=-N}^{N} Y_1(j) \cdot (h_1 * g_1)(j)}{\sum [(h_1 * g_1)(j)]^2}.$$

23. A Transmission method for compressed image data, wherein after execution of an appropriate transform coding, sample quantization and run length/variable length coding, further after transmission of the compressed image data via a transmission channel and after run-length/variable length decoding and transform decoding an error correction for obtained samples is executed using the channel error correction method, comprising the steps:

carrying out a first synthesis to generate a preliminary output signal from subband signals received via a transmission channel through subband synthesis;

analyzing the preliminary output signal through subband filtering without downsampling to generate reanalyzed subband signals for identification of subband specific error patterns therein;

compensating errors in the originally received subband signals using error compensation information derived from the reanalyzed subband signals; and using the error compensated subband signals for the synthesis of a final output signal.

* * * * *